Oct. 24, 1967
G. L. CAPRIO
3,349,173
TELEVISION RECEIVER AGC CIRCUIT
Filed Jan. 2, 1964
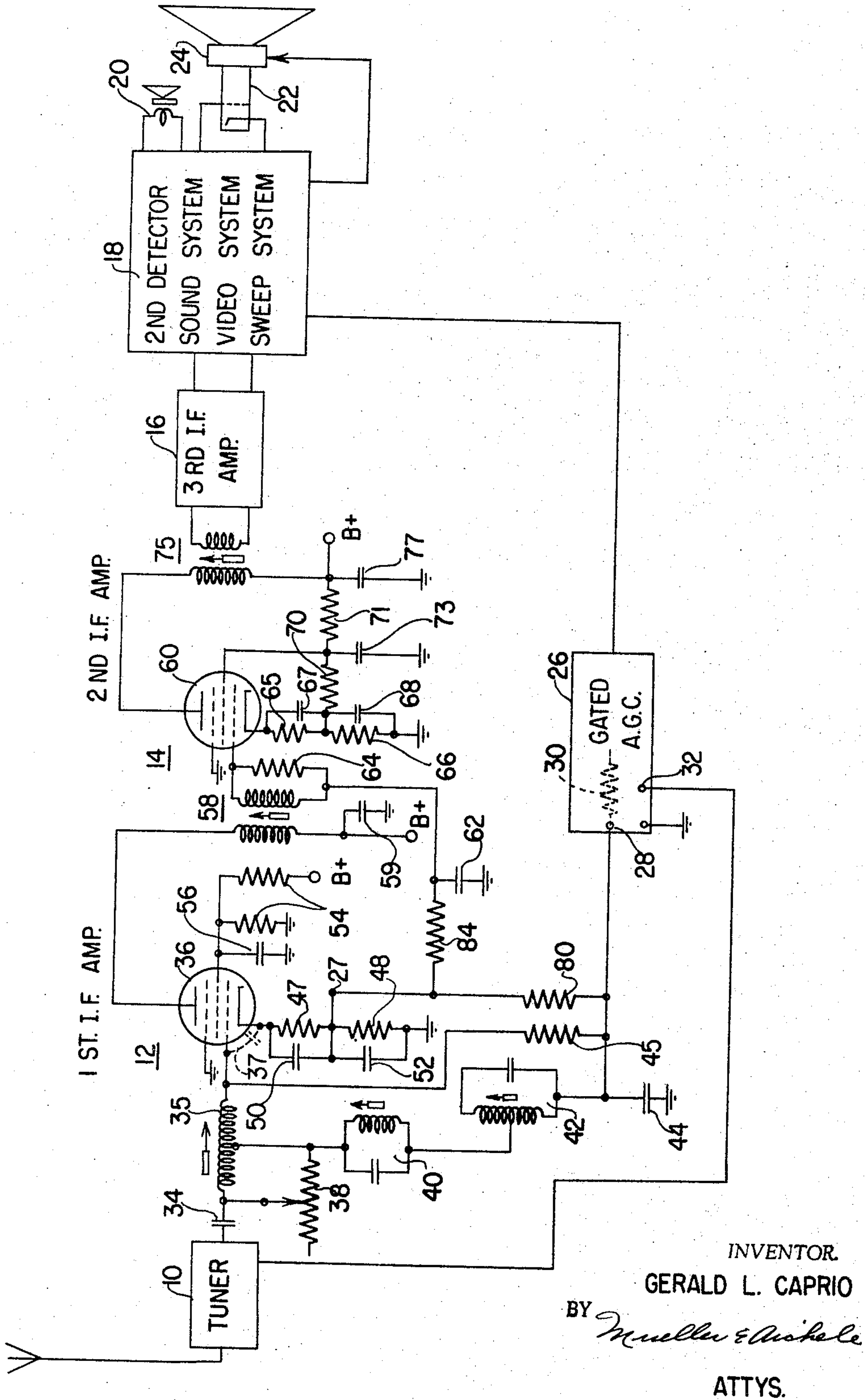
INVENTOR.
GERALD L. CAPRIO
BY *Mueller & Aichele*
ATTYS.

United States Patent Office 3,349,173

Patented Oct. 24, 1967

3,349,173

TELEVISION RECEIVER AGC CIRCUIT

Gerald L. Caprio, Mount Prospect, Ill., assignor to Motorola, Inc., Franklin Park, Ill., a corporation of Illinois Filed Jan. 2, 1964, Ser. No. 335,061
2 Claims. (Cl. 178—7.3)

ABSTRACT OF THE DISCLOSURE

The receiver includes a first IF amplifier tube with its cathode coupled through a pair of resistors to ground, with the junction of the resistors being DC coupled to a second IF amplifier tube. A gain control potential is applied to the first IF tube to vary its gain and to provide a further control potential at the junction of the resistors to control the gain of the second tube. The second resistor has a value substantially smaller than the output impedance of the AGC circuit so that a capacitor which filters the further control potential rapidly discharges through such resistor.

This invention relates to automatic gain control systems and more particularly to an improved automatic gain control system for high gain cascaded amplifiers such as used to provide IF amplification in television receivers.

It is usual to provide automatic gain control (AGC) of the signal amplifiers in radio and television receivers, for example, the radio frequency and intermediate frequency (IF) amplifiers in such receivers. To achieve desirable gain for weak signals most television receivers have two or three stages of intermediate frequency amplification, and, of course, the gain of one or more of these stages should be reduced upon reception of strong signals in order to avoid distortion. With two or more cascaded stages of amplification, the AGC potential is generally applied to the amplifiers by parallel connection of an AGC source to the control electrodes of the amplifier devices or tubes for regulating the gain of these tubes inversely with signal strength.

A problem of noise streaking in the reproduced television image and/or impairment of the picture synchronism can arise in a television receiver having the above described AGC system. This difficulty stems from noise pulses or other spurious energy being translated in the high gain amplifier when the AGC system has a relatively long time constant. For example, a noise burst can cause grid current to be drawn in the second IF amplifier so that associated AGC filter capacitors are charged by such a noise burst. Due to the relatively large resistance in the normal AGC circuit, the charge may be retained to bias back the amplifier resulting in signal impairment until such time as the AGC filter capacitor is discharged. The effect may be most noticeable on weak or medium level signals when the gain of the amplifier system is high (that is, when the AGC has not reduced the gain of the system by a significant amount), so that a noise signal is given full amplification by the first amplifier and it reaches the second amplifier with sufficient amplitude to cause undesirable charging of the RC filter for the second IF amplifier.

An object of the present invention is to overcome the above described problem and to render an amplifier with an AGC system less susceptible to spurious signal paralysis.

Another object is to improve the synchronization of a television receiver and to lessen its susceptibility to noise streaking.

A more specific object is to reduce the RC time constant in an automatic gain control system which controls a series of cascaded amplifiers.

In a specific form of the invention as used in a three stage IF amplifier of a television receiver, the first stage has an amplifier tube with its control grid connected to a relatively high impedance source of automatic gain control potential. The cathode circuit of the amplifier tube includes a cathode bias resistor and an AGC developing resistance connected between the cathode biasing resistor and ground. The grid-to-cathode circuit of a following amplifier is connected across the AGC developing resistance. Automatic gain control in the first amplifier is reflected as a voltage change across the AGC developing resistance and applied to the second amplifier tube. The AGC developing resistance is substantially larger in value than the cathode bias resistor so that a suitable potential change is developed to be applied to the second stage. However, the value of the AGC developing resistance is very much smaller than (of the order of one thousandth) the impedance of the AGC source so that a filter capacitor for the gain control potential in the grid circuit of the second amplifier can be more readily discharged by this much smaller resistance, in the event that the second amplifier is overloaded by noise and grid current is drawn. Thus, the second amplifier stage may quickly recover and tendency for spurious signal paralysis of its AGC network is reduced. The complete biasing system for the second amplifier tube may also include a potential divider circuit connected to the receiver power supply to provide a cathode bias potential of fixed level for the tube in order to establish its minimum grid-to-cathode bias.

In the drawing, the figure is a diagram, partly in schematic and partly in block, representing a television receiver incorporating the circuit of the invention.

The television receiver in the figure includes a tuner 10 connected to an antenna for picking up a television signal which is selected, amplified, and heterodyned to a signal of fixed or intermediate frequency. The television signal, including video frequency components, synchronizing signal components and the modulated sound subcarrier, is then applied to the first IF amplifier 12, the second IF amplifier 14 and the third IF amplifier 16, which increase the level of the signal and provide adjacent channel selectivity. The signal is then applied to the remainder of the receiver circuitry, represented by a receiver portion 18, which includes a customary second detector, a sound amplifier and demodulator system, a video amplifier system and suitable sweep circuits all of which may be in accordance with known construction. The demodulated sound component of the television signal is applied to the loudspeaker 20 for reproduction and the video signal components are applied to the cathode ray picture tube 22 for reproduction thereby. The sweep system in the circuit 18 is connected to the deflection yoke 24 on the neck of the tube 22 to provide suitable scanning signals for the beam in the picture tube.

The AGC circuit 26 is direct current connected to the circuit 18 following the second detector so that there is available at the terminal 28 a potential which becomes more negative with respect to a reference point 27 as the level of the received signal increases. The circuit 26 is preferably gated by the line sweep system whereby the AGC system responds only during the occurrence of the horizontal synchronizing pulses to render the AGC system immune to spurious noise pulses which may occur between horizontal synchronizing pulses and cause an improper AGC potential to be developed. The AGC system as briefly described is known in the art and need not be further described for purposes of understanding the present invention. It should be understood however that an AGC system as contemplated would generally have an impedance at terminal 28 with respect to ground which exceeds 500,000 ohms and may run as high as 3 or 4 megohms. This impedance is represented by the resistor 30. It should also be understood that in accordance with usual television practice the AGC system 26 will develop a control voltage for application to the tuner 10 and reduction of the gain thereof as the signal level increases. Accordingly, terminal 32 is shown connected to the tuner 10. Generally, the AGC potential from terminal 28 will be the full gain control potential to reduce the IF gain as long as the signal is above a given level, whereas the AGC potential available at terminal 32 and applied to the tuner 10 would be divided down or reduced in amplitude so that the amplification of stage 10 is not reduced until the signal has reached a higher level.

Turning now to the detailed circuitry of the IF amplifiers 12 and 14, it may be seen that the signal is applied to the amplifier 12 through the tuned circuit consisting of capacitor 34 and a variable inductance coil 35 and the input capacitance 37 of tube 36 to the control grid of the remote cutoff pentode amplifier tube 36. A variable resistor 38 is connected across a portion of coil 35 for adjustment of the resistive component of the coupling circuit that is reflected as a negative resistance into the "bridged-T" trap circuit. The tap of the coil 35 is connected in series with the parallel tuned circuit 40 which in turn is connected to a tap of the inductor in the parallel tuned circuit 42. Tuned circuit 40 is a 47.25 megacycle trap and the tuned circuit 42 is a 39.75 megacycle trap. The bottom of the trap 42 is bypassed through a large bypass capacitor 44. The resistor 45 is connected from the bottom side of the tuned trap 42 to the control grid of tube 36 to set the proper bandpass characteristic.

The cathode of tube 36 is connected through the cathode bias resistor 47 and the AGC developing resistance 48 to ground. The relatively small value capacitor 50 is connected across the resistor 47 for compensation purposes, the small value being desirable to minimize changes in effective input conductance of the tube 36 with change in applied bias. A bypass capacitor 52 is connected across the resistor 48.

The screen grid of tube 36 is connected to a tap point of a potential divider 54 connected between B+ and ground and the screen grid is bypassed by means of a capacitor 56. The anode of pentode tube 36 is connected through the primary winding of the tuned IF coupling transformer 58 to the B+ energizing potential and the bottom of the primary winding of transformer 58 is bypassed through the capacitor 59.

The second IF amplifier includes a remote cutoff pentode amplifier tube 60 having a control grid which is connected to the secondary winding of coupling transformer 58, the other side of this secondary winding being bypassed for signal frequencies by means of a capacitor 62. A damping resistor 64 is connected across the secondary winding of transformer 58. The cathode of tube 60 is connected through the cathode bias resistor 65 and the resistor 66 to ground. Resistor 65 is shunted with capacitor 67, which is selected to minimize changes in effective input conductance with different applied bias. The resistor 66 is bypassed for signal frequencies by means of the capacitor 68.

Resistors 70 and 71 are series connected from the junction of resistors 65 and 66 to the B+ potential source for the receiver. Accordingly, a voltage divider is formed by resistors 66, 70 and 71 to apply a stable voltage to the bottom of cathode bias resistor 65 to fix the cathode of tube 60 at a positive potential with respect to ground, below which the cathode potential will not fall.

The screen grid of tube 60 is connected to the junction of resistors 70 and 71 to be energized by a suitable positive potential available at this point and the screen grid is bypassed to ground by means of the capacitor 73. The anode of tube 60 is connected to the primary winding of the IF coupling transformer 75. The bottom side of the primary winding is connected to the B+ potential and is bypassed through the capacitor 77. Tuned coupling transformer 75 includes a secondary winding connected to the third IF amplifier 16 which may be of a known construction.

As previously explained, an AGC potential is available at terminal 28 which is negative with respect to the AGC reference point 27 and which becomes more negative as the signal level of a received signal increases. Terminal 28 is direct current connected to the control grid of tube 36 through the inductors of tuned circuits 40 and 42, as well as the inductor 35. Capacitor 44 connected from terminal 28 to ground is an AGC bypass or filter capacitor to reduce amplitude variations in the AGC potential which might be introduced through the gated AGC system. Terminal 28 is also connected through the resistor 80 to the junction of resistors 47 and 48. This references the AGC system to the junction of resistors 47 and 48 for the amplifier 12. Since resistor 80 is very much larger than resistor 48, the AGC potential applied between the control grid and cathode of tube 36 is essentially the potential developed across the resistor 80. Typically, however, the valve of resistor 80 would be some fraction of the value of the internal resistance 30 of the AGC system 26 so that only part of the total AGC potential would be applied to the amplifier tube 36.

An AGC potential for the tube 60 in the second IF amplifier 14 is derived across the resistor 48 in the cathode circuit of the tube 36. As will be evident upon further explanation, the RC time constant of the coupling and filter-network which applies the gain control potential to the grid of tube 60 may be made comparatively small so that if grid current is drawn in tube 60 and the bypass capacitor 62 becomes charged, a minimum time will elapse before it is discharged so that the stage may recover to its normal operation rapidly.

The junction of resistors 47 and 48 in the cathode circuit of amplifier tube 36 is connected through the resistor 84 and the secondary winding of the transformer 58 to the control grid of tube 60. The junction of resistor 84 and the secondary winding of transformer 58 is bypassed to ground by means of capacitor 62 which acts as an AGC filter capacitor. It may be noted that one terminal of resistor 48 is grounded, and, of course, the cathode of the tube 60 is referenced to ground, although established at a fixed positive potential with respect to ground due to the voltage divider 66, 70 and 71. A voltage positive with respect to ground will be applied to the control grid of tube 60 due to the conduction through the resistor 48 in the cathode circuit of the tube 36. However, the fixed bias applied to the cathode of tube 60 is more positive with respect to ground than the potential applied to the control grid of tube 60, so that the net potential between grid and cathode of tube 60 is negative by a proper amount to establish a desired maximum gain of this tube when no signal is being received.

However, as a signal of substantial amplitude is received, an AGC potential will be applied to the tube 36 to reduce its conduction and thus reduce the conduction through resistor 48 thereby lowering the potential at the junction of resistors 47 and 48. Such a lower potential at this junction is, of course, applied to the control grid of tube 60 through the resistor 84 thereby reducing the gain of the second IF amplifier stage. Obviously the converse in operation takes place if the receiver is first receiving a strong signal which develops a relatively large gain reducing potential and then the receiver is subjected to no signal operation, or a weaker signal operation. That is, under such conditions the potential at the junction of resistors 47 and 48 will rise in a positive direction to bring the control grid of tube 60 closer to the relatively fixed potential of its cathode to increase the gain in tube 60, while at the same time the potential at terminal 28 is becoming less negative to increase the gain of the tube 36.

In some types of prior art IF amplifier systems for television receivers it has been found possible to "stack" the IF amplifiers, that is, energize the first and second amplifiers in a series circuit across the B+ suppply. In this way the automatic gain control of the first amplifier can control the second amplifier since the two are connected in series from the standpoint of the direct current energizing potential. However, if the B+ potential available in the receiver is not high enough for stacking (e.g., 140 volts), it may be necessary to connect the two stages separately in parallel to the B+ energizing supply as are the amplifiers 12 and 14. Customarily the control grid of tube 36 as well as the control grid of tube 60 would be connected to the terminal 28 of the AGC system so that the AGC would be effectively parallel fed to both of these tubes. It should be recognized that the second IF amplifier 14 will be translating signals at a considerably higher amplitude level than those in stage 12 and thus high level noise signals may draw grid current in tube 60 to charge the filter capacitor corresponding to capacitor 62 and the capacitor corresponding to capacitor 44. Then the discharge path for such capacitors after the disappearance of the noise pulse would be through the internal impedance 30 of the AGC system. However, in the system described herein the capacitor 62 may discharge through the resistors 48 and 84 which are very much lower in value than the resistance 30. The circuit hereof does not improve the situation with regard to charging capacitor 44; however, because of the much lower signal level at the input to amplifier 12 this source of "noise streaking" is not ordinarily objectionable.

In a system of practical construction component values may be as follows, and these values suggest desirable practical relationships among the significant components of the system:

| | |
|---|---|
| Resistance **30** | Generally exceeding .5 megohm and typically 2 megohms. |
| Tube **36** | 6EH7. |
| Capacitor **44** | .22 mdf. |
| Resistor **47** | 22 ohms. |
| Resistor **48** | 600 ohms. |
| Capacitor **50** | 39 mmfd. |
| Capacitor **52** | .001 mfd. |
| Tube **60** | 6EH7. |
| Capacitor **62** | .001 mfd. |
| Resistor **65** | 22 ohms. |
| Resistor **66** | 390 ohms. |
| Capacitor **67** | 47 mmfd. |
| Capacitor **68** | .001 mfd. |
| Resistor **70** | 8,200 ohms. |
| Resistor **71** | 6,800 ohms. |
| Resistor **80** | 680,000 ohms. |
| Resistor **84** | 18,000 ohms. |

The described AGC system finds particular application in the IF amplifier system of a television receiver operative over a wide range of signal input levels. The circuit has the advantage of a reduced RC time constant in the AGC filtering network in order to permit a more rapid recovery of the system should the IF amplifier become temporarily disabled through grid circuit charge-up on high level noise signals. In this way, it is possible to reduce streaking in the reproduced image which would be caused by deterioration of the translated signal during the time when spurious energy would otherwise cause the amplifier to operate at some undesired bias level. Furthermore, permitting the IF amplifier to more quickly recover from spurious noise signals will tend to improve the translation of the synchronizing signal components therethrough which assists the receiver in maintaining proper synchronization in the beam scanning process within the picture tube.

What is claimed is:

1. In a television receiver including a tuner for converting received television signals into intermediate frequency signals, first and second amplifiers coupled in cascade and coupled to the tuner for amplifying the intermediate frequency signals, circuit means coupled to the second amplifier for converting the intermediate frequency signals into video signals, a gain control system including in combination; a gated automatic gain control circuit coupled to the circuit means for providing a first gain control potential varying with the level of the television signals and having an output impedance, the first amplifier having a first electron amplifier tube with control grid and cathode electrodes, first and second resistors series coupled between said cathode electrode and a reference point, means direct current coupling said automatic gain control circuit to said control grid electrode for coupling said first gain control potential to said first tube for varying the gain thereof inversely with the level of the television signals and for providing a second gain control potential across said second resistor varying with the level of the television signals, said second amplifier having a second electron amplifier tube with a control grid electrode, a coupling and filtering network direct current coupling the junction of said first and second resistors to the control grid electrode of said second tube for coupling said second gain control potential thereto for varying the gain of said second tube inversely with the level of the television signals, said network including bypass capacitor means to filter said second gain control potential and subject to undesirably charge in response to noise pulses in the television signals, said second resistor having a value substantially less than the value of said output impedance of said automatic gain control circuit for rapidly discharging said capacitor means to thereby reduce the effect of the noise pulses.

2. A gain control system for a receiver of wave signals, including in combination, first and second amplifiers connected in cascade for amplifying the signals, said second amplifier having an output, means coupled to said output and including an automatic gain control circuit for providing a first gain control potential varying with the level of the signals and having an output impedance, said first amplifier having a first electron amplifier tube with a control electrode for regulating the gain thereof and further having a common electrode carrying current therein, a first resistor coupled to said common electrode, a second resistor coupled between said first resistor and a reference point and having a value substantially greater than the value of said first resistor to cause current variations in said first tube to be reflected as a second gain control potential appearing across said second resistor, means coupling said automatic gain control circuit to said control electrode for applying said first gain control potential thereto for controlling conduction of said first electron amplifier tube to vary the gain thereof and to vary said second gain control potential, said second amplifier having a second electron amplifier tube with input electrodes, means coupling said second resistor to said input electrodes for applying said second gain control potential thereto for varying the gain of said second tube, a filter capacitor coupled between said input electrodes for filtering said second gain control potential and subject to undesirably charge in response to noise pulses in the wave signals, said second resistor having a value substantially less than the value of said output impedance of said automatic gain control circuit for rapidly discharging said capacitor means to thereby reduce the effect of the noise pulses.

References Cited

UNITED STATES PATENTS 2,989,588 6/1961 Thomas ............ 178—7.3

JOHN W. CALDWELL, *Acting Primary Examiner.*

DAVID G. REDINBAUGH, *Examiner.*

R. L. RICHARDSON, *Assistant Examiner.*